United States Patent [19]
Roser

[11] Patent Number: 5,868,303
[45] Date of Patent: Feb. 9, 1999

[54] TACK GRIPPER FOR A TACK WELDING GUN AND PROCESS FOR CONNECTING A STRIP-FORM WORKPIECE TO A COMPONENT

[75] Inventor: Hermann Roser, Wermelskirchen, Germany

[73] Assignee: Emhart Inc., Newark, Del.

[21] Appl. No.: 651,461

[22] Filed: May 23, 1996

[30] Foreign Application Priority Data

May 26, 1995 [JP] Japan ............................. 195 19 443.8

[51] Int. Cl.⁶ .................................................. B23K 11/14
[52] U.S. Cl. ............................................................ 228/212
[58] Field of Search ........................ 228/57, 212; 219/56

[56] References Cited

U.S. PATENT DOCUMENTS 3,678,241  7/1972  Erlandson ................................ 219/74
3,729,125  4/1973  Hano ....................................... 219/56

*Primary Examiner*—Kenneth J. Ramsey
*Attorney, Agent, or Firm*—Edward D. Murphy

[57] ABSTRACT

The invention provides a tack gripper for a tack welding gun wherein the tack gripper is U-shaped in design. The tack gripper has two arms connected by a base. At least one arm of the tack gripper is resilient in design. The arms have a bent back portion at their free end. The portion is arranged between the respective arms. The portions contain holes in which the catch knobs formed on the workpiece to be welded can engage.

23 Claims, 1 Drawing Sheet

TACK GRIPPER FOR A TACK WELDING GUN AND PROCESS FOR CONNECTING A STRIP-FORM WORKPIECE TO A COMPONENT

The invention relates to a tack gripper for a tack welding gun, a workpiece which can be tack welded to a component by means of a tack welding gun with a tack gripper and a process for connecting a preferably strip-shaped workpiece to a component.

BACKGROUND OF THE INVENTION

Welding has evolved in mechanical engineering to a production process with broad applications which is adopted in particular in the case of light construction. Welding also affords an excellent opportunity to reduce the assembly cost of components. In the production of motor vehicles, in particular, welding is the main process for body assembly. Workpieces which serve as fastening and/or holding elements are welded on the body.

It is known to arrange, for example, solid bolts on the body by welding. The welding process as such is substantially automated. The positioning of the workpieces, in particular in the vehicle body region, also takes place substantially automatically. Apparatuses which combine a welding device and a supply device for workpieces are also known.

For the tack welding of workpieces, in particular strip-form workpieces, welding guns are provided with tack grippers. These tack grippers are designed in the manner of tongs. As a result, these tack grippers have a plurality of mechanically moving parts. Welding spatter which impairs the operability of the mechanically moving parts of the tack gripper can be formed during the welding process. In addition to such welding spatter, the mechanically moving parts are contaminated so the mechanically moving parts are subject to increased wear in the course of time. It may also happen that the holding force of the tack gripper no longer suffices as the tong-form tack gripper is inaccessible. It has also been found that contamination on the surfaces of the tack gripper adversely affect the reliable supply of current owing to welding spatter and that the desired resultant weld is not therefore always obtained. As a result, the welds have to be reworked under certain circumstances.

SUMMARY OF THE INVENTION

On the basis of the foregoing, an object of the present invention is to develop a tack gripper which has a smaller number of moving parts. The tack gripper is also to be almost self-cleaning in design. A further object is to provide a process by means of which a strip-form workpiece can be reliably and economically connected to a component. A further object of the invention is to design a workpiece in such a way that it can be gripped reliably and positioned exactly by a tack gripper.

The tack gripper according to the invention for a welding gun is distinguished in that the tack gripper is U-shaped in design with two arms connected via a base, at least one free arm of the tack gripper being resilient. The formerly adopted route is abandoned with this design of the tack gripper according to the invention. In contrast to the known tack gripper, the tack gripper according to the invention has at least one resilient free arm instead of mechanically moving parts. With this design of a tack gripper, a frictional joint is created between the tack gripper and a component which is clamped between the arms. The distance between the arms is dimensioned in such a way that the arms are automatically spread during the gripping of the workpiece.

During the gripping process, the surfaces of the arms rub against the surfaces of the workpiece so the surfaces of the arms, which also act as contact surfaces for the welding current to be introduced are cleaned. The cleaning process is repeated when the tack gripper is removed from the workpiece so two cleaning processes invariably take place during one welding process.

Each arm is preferably detachably connected to the base. Therefore, the arms can easily be exchanged. A further advantage of this design is that the distance between the arms can be increased by spacer members arranged between the base and the arm. The tack gripper can therefore easily be adapted to workpieces of various thicknesses.

According to a further idea, it is proposed that at least one arm be designed with at least one hole in its region adjacent to its free end. If several holes are provided, they are aligned in a line extending transversely to the length of the arm. The design of the tack gripper has the advantage that a workpiece can be provided with catch knobs which engage at least partially in a hole in the arm. This allows, on the one hand, reliable transmission of the welding current and, on the other hand, exact positioning of the workpiece in the tack gripper.

Since the arms are provided with holes, they cannot be clogged by contamination or the like.

At least one arm of the tack gripper has, at its free end, a portion which is bent over itself, the portion being arranged between the arms. If holes are provided in the arms, they are formed in the bent over portion. The bent over portion has the advantage of simplifying introduction of a workpiece into the space between the arms or the portions. The bent over portion also increases the spring action of the arms.

The welding current is transmitted through the arms. The electric resistance of the arms should therefore be as low as possible. Bronze can be considered as a suitable material for forming the arms and/or the base. The spring strength or spring rating of the material of which the arms consist can sometimes be considered as too low to produce an adequate holding force. It is therefore proposed that at least one arm be spreadable against an additional spring force. At least one spring element arranged on an arm is provided for this purpose. This spring element can be a spring subjected to bending stress, the spring element being fixed at one end in a region of the arm in which the arm at least partially overlaps the base. A spring element which is a leaf spring is preferred. The leaf spring can also consist of spring steel. To increase the spring force exerted on the respective arm by the spring element it is proposed that the spring element be designed in such a way that it is curved in an arc toward the arm at least at its free end.

The welding current is preferably introduced into the workpiece via the base and the arms. For this purpose, the base is formed by a cuboid carrier having a connection to the welding head of the tack welding gun on one of its end faces. The arms and optionally the spring element or the spring elements are preferably screwed to the cuboid carrier.

In order to center the arms on the carrier, each arm has a groove in which a respective base formed on the carrier engages. The centering of the arms is particularly important if each arm has, in a region adjacent to its free end, at least one hole which cooperates with catch knobs formed on the workpiece.

To minimize the production costs of the tack gripper according to the invention, it is proposed that the arms of the tack gripper be identical in design. The storage of spare arms is therefore also minimized. The leaf springs can be standard springs.

The thermal stress on the tack gripper during the welding process can be considerable. If the tack gripper is used in a handling device, the time interval between two welding processes is sometimes too small to allow adequate cooling of the tack gripper. It is therefore proposed that the tack gripper be designed so as to allow the fastest possible discharge of heat and therefore cooling of the tack gripper. It is proposed for this purpose that the base and/or the arms be provided with at least one cooling fin. If the convective cooling of the tack gripper is not adequate or not fast enough, the base can be designed with at least one cooling duct which is connected to a coolant supply system, instead of cooling fins or in addition to them. The base can have several cooling ducts for this purpose.

If a coolant which is conveyed through the cooling ducts is used, an embodiment in which the coolant is circulated is preferred. This prevents losses of coolant. In order to produce a circuit, it is therefore proposed that the duct or ducts formed in the base be connected to the coolant supply system via a feed conduit and a discharge conduit. The coolants can be protective gas, water and/or air. It is particularly appropriate to use protective gas as coolant as it is required during the cooling process anyway.

The tack gripper according to the invention for a tack welding gun is preferably used for workpieces comprising at least a pair of gripping surfaces grippable by a tack gripper, at least one of the gripping surfaces being designed with at least one catch knob engaging at least partially in a hole in an arm. This results in reliable holding of the workpiece and very good electrical contact between the workpiece and the tack gripper. The catch knobs are preferably formed by embossment. The height of the catch knobs is preferably between 0.3 and 0.5 mm. The height is adequate to ensure a secure hold in the holes. However, the knobs are not so markedly embossed that they are still visible after painting of the workpiece.

According to a further idea of the invention, a process for connecting a strip-form workpiece, preferably a workpiece comprising catch knobs on the gripping surfaces, is proposed with a component in which a tack gripper of a tack welding gun grips and frictionally holds a portion of metallic band. A separating device severs a strip of predetermined length from the band. The strip forms a workpiece. The workpiece held by the tack gripper is initially positioned on the component and then welded thereto. On termination of the welding process, the tack gripper is removed from the workpiece. The tack gripper can grip another portion of a metallic band. The procedure is repeated. The process is automated in this way. Moreover, the tack gripper formed on the tack welding gun avoids the need for further feed arrangements.

Further advantages and features will be described with reference to an embodiment of a tack gripper and a workpiece.

DESCRIPTION OF THE PREFERRED EMBODIMENT

Figure 1:
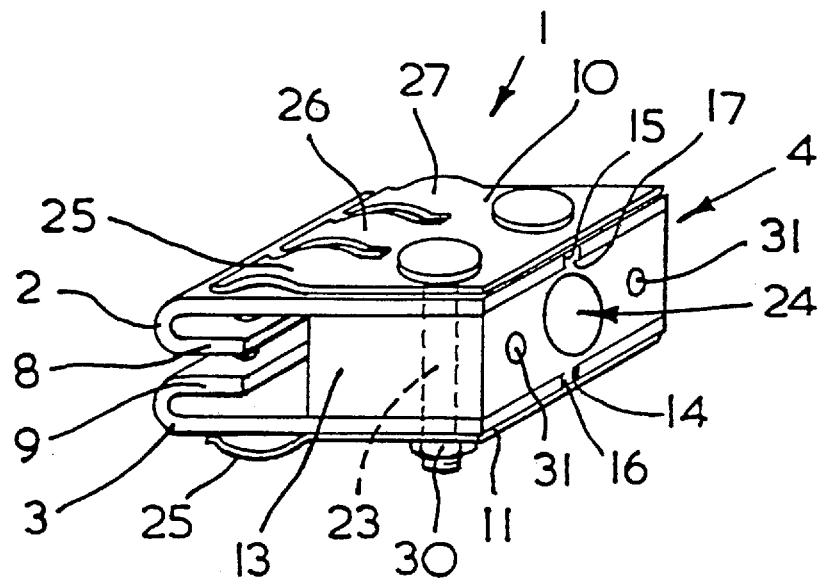
FIG. 1 is a perspective schematic view of a tack gripper.

FIG. 1 shows an embodiment of a tack gripper 1 which is U-shaped in design. The tack gripper comprises a base 4 to which two arms 2, 3 are connected. The base 4 is formed by a cuboid carrier 13. Bores (not shown) through which screws 23 extend are formed in the carrier 13. The screws 13 are screwed to nuts 30.

24 designates a receiving bore 24 which is formed in the carrier 13 and serves to connect the tack gripper 1 to the welding head of a tack welding gun and to the welding current supply. The carrier 13 has cooling ducts 31 through which a coolant such as water can be conveyed. Connecting lines which connect a coolant supply system to the cooling ducts 31 are not shown. The carrier 13 and/or the arms 2, 3 can be provided with cooling fins in addition to cooling ducts 31 or instead of them. The term cooling fins includes plane fins and rod-shaped fins. If plane fins are formed on the arms 2, 3, they preferably extend transversely to the length of the arms 2, 3 to prevent the resilience of the arms 2, 3 being eliminated by plane fins.

Figure 2:
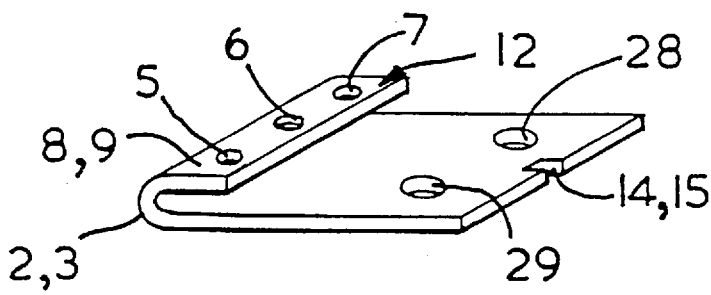
FIG. 2 shows an arm.

Each arm 2, 3 is resilient in design. The arms 2, 3 are identical in design. Each arm 2, 3 has holes 5, 6, 7 in a region 12 adjacent to its free end. The holes 5, 6, 7 are aligned transversely to the length of the arm 2, 3. The arm 2, 3 has, at its free end, a portion 8 or 9 which is bent over itself. The portion 8 or 9 is arranged between the arms. As shown in FIG. 2, the holes 5, 6 and 7 are formed in the bent over portion 8 or 9.

The two arms 2, 3 can be spread against an additional spring force in each case. A spring element 10 or 11 is arranged on the arm 2 or 3. This spring element 10, 11 is a spring subjected to bending stress. The spring element 10, 11 is fixed at one end in a region of the arm 2, 3 by the screw connection 23.

The spring element 10 or 11 has three resilient tongues 25, 26 and 27 which are formed at a distance from one another. Each spring tongue 25, 26 and 27 is curved in the form of an arc to the arm 2 or 3 in its front region.

Each arm 2, 3 has a groove 14, 15 in which a respective projection 16 or 17 formed on the carrier 13 engages. To fix the arm 2 or 3 on the carrier 13, the arm 2 or 3 has orifices 28, 29 through which a screw 23 penetrates. Corresponding apertures (not shown) are formed on the respective spring element 10 or 11.

Figure 3:
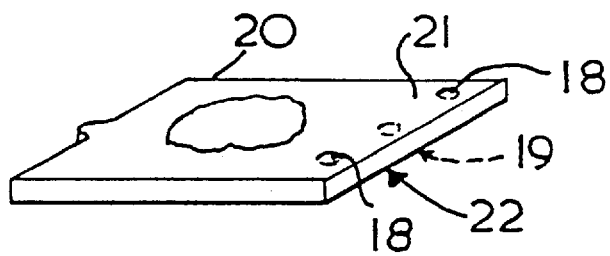
FIG. 3 shows a workpiece in perspective.
Figure 4:
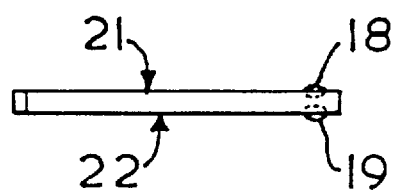
FIG. 4 shows the workpiece according to FIG. 3 in a front view.

FIG. 3 shows a workpiece 20. The workpiece 20 is a strip-form part. The workpiece 20 has a pair of gripping surfaces 21, 22 which can be gripped by a tack gripper 1. Catch knobs 18 are formed on the gripping surface 21. A catch knob 19 is formed on the gripping surface 22. The knobs 18, 19 lie on an imaginary straight connecting line. The design of the knobs 18, 19 creates three-point contact which provides a defined location for the workpiece 13 in the tack gripper. The catch knobs 18 or 19 are arranged in such a way that the catch knobs engage in the holes 5, 6, 7 of the arm 2 or 3.

What is claimed:

1. A tack gripper for a tack welding gun, characterized in that the tack gripper (1) is designed in the form of a U with two arms (2, 3) connected via a base (4), at least one free arm (2, 3) of the tack gripper (1) being resilient.

2. A tack gripper according to claim 1, characterized in that at least one said arm (2, 3) has at least one hole (5, 6, 7) in a region (12) adjacent to its free end.

3. A tack gripper according to claim 2, characterized in that a plurality of holes (5, 6, 7) are provided, said holes being aligned transversely to the length of the arm (2, 3).

4. A tack gripper according to claim 3, characterized in that at least one said arm (2, 3) has, at its free end, a portion (8, 9) which is bent over itself, said portion (8, 9) being arranged between the arms (2, 3) and said holes (5, 6, 7) optionally being formed in the portion (8, 9).

5. A tack gripper according to claim 1, characterized in that each said arm (2, 3) is detachably connected to said base (4).

6. A tack gripper according to claim 2, characterized in that at least one arm (2, 3) can be spread against an additional spring force.

7. A tack gripper according to claim 6, characterized in that at least one spring element (10, 11) is arranged on at least one said arm (2, 3).

8. A tack gripper according to claim 7, characterized in that said spring element (10, 11) is a spring subjected to bending, the spring element (10, 11) being secured on one side in a region of said arm (2, 3) in which said arm (2, 3) at least partially overlaps said base (4).

9. A tack gripper according to claim 8, characterized in that said spring element (10, 11) is a leaf spring.

10. A tack gripper according to claim 8, characterized in that said spring element (10, 11) is curved in the form of an arc toward the arm (2, 3) at least at its free end.

11. A tack gripper according to claim 10, characterized in that said base (4) is formed by a cuboid carrier (13).

12. A tack gripper according to claim 11, characterized in that said arms (2, 3) and said spring element (10, 11) are screwed to said carrier (13).

13. A tack gripper according to claim 12, characterized in that each said arm (2, 3) has a groove (14, 15), a pair of respective projections (16, 17) being formed on said carrier (13), said projections being engageable in said grooves.

14. A tack gripper according to claim 13, characterized in that said base (4) and said arms (2, 3) consist of bronze.

15. A tack gripper according to claim 13, characterized in that said arms (2, 3) are identical in design.

16. A tack gripper according to claim 13, characterized in that at least one of said base (4) and said arms (2, 3) have at least one cooling fin disposed thereon.

17. A tack gripper according to claim 13, characterized in that the base (4) has at least one cooling duct (31) which is connected to a coolant supply system.

18. A tack gripper according to claim 17, characterized in that said duct (31) is connected to the coolant supply system via a feed conduit and a discharge conduit.

19. A tack gripper according to claim 17, characterized in that the coolant is protective gas, water and/or air.

20. A workpiece which can be tack welded by means of a tack welding gun with a tack gripper according to claim 15 to a component having at least a pair of gripping surfaces grippable by a tack gripper (1), wherein at least one of said gripping surfaces (21, 22) is formed with at least one catch knob (18, 19); at least one of said arms (2, 3) is provided with at least one hole (5, 6, 7); said catch knob being adapted to engage in said hole.

21. A workpiece according to claim 20, characterized in that said catch knobs (18, 19) are formed by embossment.

22. A workpiece according to claim 20, characterized in that said catch knobs (18, 19) have a height of 0.3 to 0.5 mm.

23. Process for connecting a strip-form workpiece to a component in which a tack gripper (1) of a tack welding gun according to claim 1, grips and frictionally secures a portion of a metallic strip-form workpiece, a separating device severs a strip of predetermined length from the, the tack gripper (1) initially positions the workpiece (20) on the component and then welds it thereto and the tack gripper (1) is then removed from the workpiece (20).

* * * * *